United States Patent
Hama et al.

(10) Patent No.: US 9,172,112 B2
(45) Date of Patent: Oct. 27, 2015

(54) SULFIDE SOLID ELECTROLYTE GLASS, LITHIUM SOLID STATE BATTERY AND PRODUCING METHOD OF SULFIDE SOLID ELECTROLYTE GLASS

(75) Inventors: Shigenori Hama, Susono (JP); Takamasa Ohtomo, Susono (JP); Yuki Kato, Susono (JP); Koji Kawamoto, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 335 days.

(21) Appl. No.: 13/814,364

(22) PCT Filed: Aug. 5, 2010

(86) PCT No.: PCT/JP2010/063325
§ 371 (c)(1),
(2), (4) Date: Mar. 5, 2013

(87) PCT Pub. No.: WO2012/017544
PCT Pub. Date: Feb. 9, 2012

(65) Prior Publication Data
US 2013/0288134 A1 Oct. 31, 2013

(51) Int. Cl.
*H01M 6/18* (2006.01)
*C01B 25/14* (2006.01)
*H01M 10/0562* (2010.01)
*C03C 3/32* (2006.01)
*C03C 4/18* (2006.01)
(Continued)

(52) U.S. Cl.
CPC ........... *H01M 10/0562* (2013.01); *C03C 3/321* (2013.01); *C03C 4/18* (2013.01); *H01B 1/10* (2013.01); *H01M 6/18* (2013.01); *H01M 10/052* (2013.01); *H01M 2300/0068* (2013.01); *Y02E 60/122* (2013.01); *Y02T 10/7011* (2013.01)

(58) Field of Classification Search
CPC ............ C03C 3/321; C03C 4/18; H01B 1/10; H01M 10/0562; H01M 10/052; H01M 6/18; H01M 2300/0068; Y02T 10/7011; Y02E 60/122
USPC .......................................... 429/322; 423/303
See application file for complete search history.

(56) References Cited

U.S. PATENT DOCUMENTS

2007/0160911 A1 * 7/2007 Senga et al. .................. 429/322

FOREIGN PATENT DOCUMENTS

EP 2139062 A1 12/2009
JP 2002-109955 A 4/2002
(Continued)

OTHER PUBLICATIONS

Machida et al., "Mechanical Milling Preparation of Amorphous Materials in the System Li3PS4-Li4P2S7-Li4P2S6 and Their Structure and Electrochemical Property," Department of Chemistry, Konan University, 2004, p. 30 (English Abstract Only).
Ikeda et al., "Preparation of Lithium-Ion Conductive Amorphous Materials in the System LiI-Li4P2S6 by Mechanical Milling Process," Department of Chemistry, Konan University 2005, p. 136 (English Abstract Only).
(Continued)

*Primary Examiner* — William Cheung
(74) *Attorney, Agent, or Firm* — Kenyon & Kenyon LLP

(57) ABSTRACT

An object of the present invention is to provide a sulfide solid electrolyte glass with high Li ion conductivity. The present invention achieves the above-mentioned object by providing a sulfide solid electrolyte glass comprising $Li_4P_2S_6$, characterized by having a glass transition point.

9 Claims, 5 Drawing Sheets

(51) Int. Cl.
*H01B 1/10* (2006.01)
*H01M 10/052* (2010.01)

(56) References Cited

FOREIGN PATENT DOCUMENTS

| JP | 2005-228570 A | 8/2005 |
|---|---|---|
| JP | 2008-103096 A | 5/2008 |
| JP | 2008-103203 A | 5/2008 |
| JP | 2008-103204 A | 5/2008 |
| JP | 2008-120666 A | 5/2008 |
| JP | 2009-193728 A | 8/2009 |
| JP | 2010-030889 A | 2/2010 |
| JP | 2010-056070 A | 3/2010 |
| JP | 2010-073544 A | 4/2010 |
| JP | 2010-090003 A | 4/2010 |

OTHER PUBLICATIONS

Eckert et al., "Structural Transformation of Non-Oxide Chalcogenide Glasses; The Short-Range Order of Li2S-P2S5 Glasses Studied by Quantitative 31P and 6,7Li High-Resolution Solid-State NMR," Department of Chemistry, University of California 1989, Chem. Mater. 1990, 2, 273-279.

A. Hayashi et al., "Development of sulfide glass-ceramic electrolytes for all-solid-state lithium rechargeable batteries," J. Solid State Electrochem (2010) 14:1761-1767.

A. Hayashi et al., "Formation of Li+ superionic crystals from the Li2S-P2S5 melt-quenched glasses," J Mater. Sci. (2008) 43:1885-1889.

A. Hayashi et al., "Preparation of Li2S-P2S5 Amorphous Solid Electrolytes by Mechanical Milling," J. Am. Ceram. Soc. (2001), 84(2): 477-79.

* cited by examiner

↓

MECHANICAL MILLING

↓

SULFIDE SOLID ELECTROLYTE GLASS

SULFIDE SOLID ELECTROLYTE GLASS, LITHIUM SOLID STATE BATTERY AND PRODUCING METHOD OF SULFIDE SOLID ELECTROLYTE GLASS

CROSS-REFERENCE TO RELATED APPLICATIONS

This application is a United States National Stage Patent Application filed under 35 U.S.C. §371, based on International Application Serial No. PCT/JP2010/063325, which was filed on Aug. 5, 2010, the entire contents of which is expressly incorporated herein by reference.

DESCRIPTION

1. Technical Field

The present invention relates to a sulfide solid electrolyte glass with high Li ion conductivity.

2. Background Art

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery. In addition, a sulfide solid electrolyte material has been known as a solid electrolyte material used for such a solid electrolyte layer.

The sulfide solid electrolyte material is so high in Li ion conductivity as to be useful for intending higher output of a battery, and various kinds of research have been conventionally made. For example, in Non Patent Literature 1, an LiI—$Li_4P_2S_6$-based amorphous substance is disclosed. Further, in Non Patent Literature 2, an $Li_3PS_4$—$Li_4P_2S_7$—$Li_4P_2S_6$-based amorphous substance is disclosed.

CITATION LIST

Non Patent Literature

Non Patent Literature 1: Mariko Ikeda, 3 others, "Preparation of Lithium-Ion Conductive Amorphous Materials in the System LiI—$Li_4P_2S_6$ by Mechanical Milling Process", The 31st Symposium on Solid State Ionics in Japan Extended Abstracts p. 136-137 (2005)

Non Patent Literature 2: Nobuya Machida, 3 others, "Mechanical Milling Preparation of Amorphous Materials in the System Li $PS_4$—$Li_4P_2S_7$—$Li_4P_2S_6$ and Their Structure and Electrochemical Property", The 30th Symposium on Solid State Ionics in Japan Extended Abstracts p. 30-31 (2004)

SUMMARY OF INVENTION

Technical Problem

For higher output of a battery, for example, a sulfide solid electrolyte material with high Li ion conductivity has been demanded. The present invention has been made in view of the above-mentioned actual circumstances, and the main object thereof is to provide a sulfide solid electrolyte glass with high Li ion conductivity.

Solution to Problem

In order to solve the above-mentioned problem, the present invention provides a sulfide solid electrolyte glass comprising $Li_4P_2S_6$, characterized by having a glass transition point.

The present invention allows the sulfide solid electrolyte glass which is high in Li ion conductivity by reason of being so high in amorphous nature as to have a glass transition point. Further, a $P_2S_6^{4-}$ structure has the advantage that stability toward water is high for the reason that the structure does not change even in contacting with water (including moisture).

In the above-mentioned invention, it is preferable that the sulfide solid electrolyte glass does not have a peak with a half-value width of 0.64° or less in a range of 32°≤2θ≤33° in measurement by an X-ray diffraction method using a CuKα ray.

Further, the present invention provides a sulfide solid electrolyte glass comprising $Li_4P_2S_6$, characterized by not having a peak with a half-value width of 0.64° or less in a range of 32°≤2θ≤33° in measurement by an X-ray diffraction method using a CuKα ray.

The present invention allows the sulfide solid electrolyte glass which is high in Li ion conductivity by reason of being so high in amorphous nature as not to have the above-mentioned peak in measurement by an X-ray diffraction method.

Further, the present invention provides a lithium solid state battery comprising a cathode active material layer containing a cathode active material, an anode active material layer containing an anode active material, and a solid electrolyte layer formed between the above-mentioned cathode active material layer and the above-mentioned anode active material layer, characterized in that at least one of the above-mentioned cathode active material layer, the above-mentioned anode active material layer and the above-mentioned solid electrolyte layer contains the above-mentioned sulfide solid electrolyte glass.

According to the present invention, the use of the above-mentioned sulfide solid electrolyte glass allows the high-output lithium solid state battery.

Further, the present invention provides a producing method of a sulfide solid electrolyte glass comprising $Li_4P_2S_6$, comprising: a synthesis step of synthesizing the above-mentioned sulfide solid electrolyte glass by performing vitrification treatment for a raw material composition containing $Li_2S$, a material having a P—P bond and a material having S.

According to the present invention, the use of the raw material composition containing a material having a P—P bond allows the sulfide solid electrolyte glass with high amorphous nature. As a result, the sulfide solid electrolyte glass with high Li ion conductivity may be obtained.

In the above-mentioned invention, the above-mentioned material having a P—P bond is preferably elemental phosphorus. The reason therefor is that the use of elemental phosphorus allows composition adjustment of the raw material composition to be facilitated.

In the above-mentioned invention, the above-mentioned material having S is preferably elemental sulfur. The reason therefor is that the use of elemental sulfur allows composition adjustment of the raw material composition to be facilitated.

In the above-mentioned invention, the above-mentioned vitrification treatment is preferably mechanical milling. The reason therefor is that the treatment at normal temperature may be performed to intend the simplification of production processes.

Advantageous Effects of Invention

The present invention produces the effect such as to allow the sulfide solid electrolyte glass with high Li ion conductivity.

DESCRIPTION OF EMBODIMENTS

Figure 1:
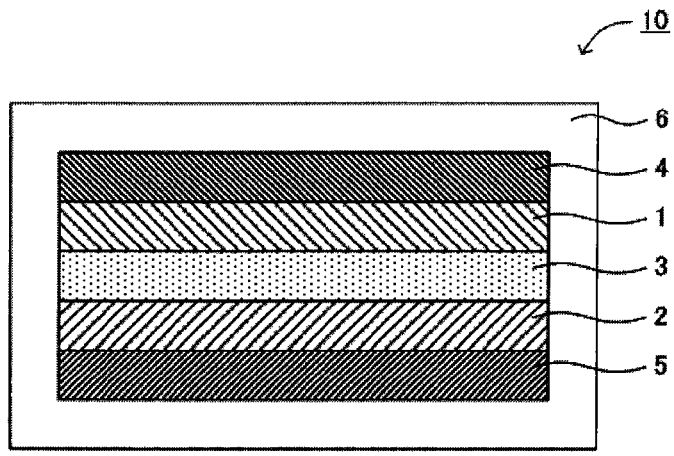
FIG. 1 is a schematic cross-sectional view showing an example of a lithium solid state battery of the present invention.

A sulfide solid electrolyte glass, a lithium solid state battery and a producing method of a sulfide solid electrolyte glass of the present invention are hereinafter described in detail.

A. Sulfide Solid Electrolyte Glass

First, a sulfide solid electrolyte glass of the present invention is described. The sulfide solid electrolyte glass of the present invention may be roughly divided into two embodiments. The sulfide solid electrolyte glass of the present invention is hereinafter described while divided into a first embodiment and a second embodiment.

1. First Embodiment

The sulfide solid electrolyte glass of the first embodiment is a sulfide solid electrolyte glass comprising $Li_4P_2S_6$, characterized by having a glass transition point.

The first embodiment allows the sulfide solid electrolyte glass which is high in Li ion conductivity by reason of being so high in amorphous nature as to have a glass transition point. Further, a $P_2S_6^4$ structure has the advantage that stability toward water is high for the reason that the structure does not change even in contacting with water (including moisture). On the other hand, even though an $Li_4P_2S_6$ crystal is high in stability toward water, the problem is that Li ion conductivity is extremely low. On the contrary, the sulfide solid electrolyte glass of the first embodiment allows the sulfide solid electrolyte glass which is high in Li ion conductivity while maintaining stability toward water by reason of being so high in amorphous nature as to have a glass transition point.

Further, in the above-mentioned Non Patent Literatures 1 and 2, an $Li_4P_2S_6$-based amorphous substance is respectively disclosed. However, an amorphous substance ordinarily signifies a substance such that periodicity as a crystal is not observed in measuring X-ray diffraction, and amorphous nature exhibited by an amorphous substance ranges to a degree. Thus, an amorphous substance with high amorphous nature and an amorphous substance with low amorphous nature exist among amorphous substances. In Non Patent Literatures 1 and 2, $Li_2S$, $P_2S_3$ and $P_2S_5$ are used as a starting material, and the use of a material not having a P—P bond such as $P_2S_5$ causes crystallinity deriving from an $Li_4P_2S_6$ crystal to be observed, as described in the after-mentioned Comparative Examples. The reason therefor is conceived to be that it is difficult to completely form a $P_2S_6^{4-}$ structure having a P—P bond from a material not having a P—P bond. As described above, the $Li_4P_2S_6$ crystal is so extremely low in Li ion conductivity that a conventional $Li_4P_2S_6$-based amorphous substance is low in Li ion conductivity despite an amorphous substance.

On the contrary, the sulfide solid electrolyte glass of the first embodiment allows the sulfide solid electrolyte glass which is so high in amorphous nature as to have a glass transition point by using a material such as a material having a P—P bond, as described later. As a result, the sulfide solid electrolyte glass with higher Li ion conductivity than a conventional $Li_4P_2S_6$-based amorphous substance may be obtained. Glass in a strict sense signifies glass such as to be an amorphous substance and have an observable glass transition point. Further, in Non Patent Literatures 1 and 2, the word amorphous substance is used but the word glass is not used.

Further, the sulfide solid electrolyte glass of the first embodiment is characterized by "comprising $Li_4P_2S_6$". The phrase "comprising $Li_4P_2S_6$" signifies comprising essentially a $P_2S_6^{4-}$ structure. In addition, the phrase "comprising essentially a $P_2S_6^{4-}$ structure" signifies the ratio of the $P_2S_6^{4-}$ structure in all anion structures of the sulfide solid electrolyte glass is 50% by mol or more. The ratio of the $P_2S_6^{4-}$ structure is preferably higher; preferably 55% by mol or more, more preferably 60% by mol or more, far more preferably 80% by mol or more, and particularly preferably 95% by mol or more.

The ratio of the $P_2S_6^4$ structure may be confirmed by Raman spectroscopy, for example. In Raman spectrum, the peak of the $P_2S_6^{4-}$ structure ordinarily appears in a range of 370 cm$^{-1}$ to 390 cm$^{-1}$. Thus, in Raman spectrum, the case where only the peak of the $P_2S_6^{4-}$ structure is confirmed and the peak of a $PS_4^{3-}$ structure is not confirmed may be determined to allow the sulfide solid electrolyte glass comprising approximately only $Li_4P_2S_6$.

In addition, the ratio of the $P_2S_6^{4-}$ structure may be confirmed by $^{13}P$ MAS NMR, for example. In NMR spectrum, the peak of the $P_2S_6^{4-}$ structure ordinarily appears in a range of δ=100 ppm to 110 ppm. The ratio of the $P_2S_6^{4-}$ structure may be determined by comparing the peak area of the $P_2S_6^{4-}$ structure with the peak area of another structure.

Further, the sulfide solid electrolyte glass of the first embodiment is characterized by having a glass transition point. The presence or absence of a glass transition point may be confirmed by differential thermal analysis (DTA). The glass transition temperature of the sulfide solid electrolyte glass of the first embodiment varies with the composition of the glass; for example, within a range of 180° C. to 400° C.

Examples of the shape of the sulfide solid electrolyte glass of the first embodiment include a particulate. The average particle diameter of the particulate sulfide solid electrolyte glass is preferably within a range of 0.1 μm to 50 μm. Further, the sulfide solid electrolyte glass of the first embodiment is preferably high in Li ion conductivity, and Li ion conductivity at normal temperature is preferably $1\times10^{-4}$ S/cm or more.

The sulfide solid electrolyte glass of the first embodiment may be used for optional uses in which Li ion conductivity is required. Above all, the sulfide solid electrolyte glass of the first embodiment is preferably used for a lithium ion battery. The reason therefor is that the sulfide solid electrolyte glass may contribute greatly to higher output of the battery. In particular, the sulfide solid electrolyte glass of the first embodiment is preferably used for a lithium solid state battery. The sulfide solid electrolyte glass of the first embodiment may be such as to have the characteristics of the after-mentioned sulfide solid electrolyte glass of the second embodiment.

2. Second Embodiment

Next, the second embodiment of the sulfide solid electrolyte glass of the present invention is described. The sulfide solid electrolyte glass of the second embodiment is a sulfide solid electrolyte glass comprising $Li_4P_2S_6$, characterized by not having a peak with a half-value width of 0.64° or less in a range of $32°\leq2\theta\leq33°$ in measurement by an X-ray diffraction method using a CuKα ray.

The second embodiment allows the sulfide solid electrolyte glass which is high in Li ion conductivity by reason of being so high in amorphous nature as not to have the above-mentioned peak in measurement by an X-ray diffraction method. Other effects are the same as the first embodiment. Further, the after-mentioned Comparative Example 1 reproduces an amorphous substance with the $Li_4P_2S_6$ composition described in Non Patent Literature 2, and with regard to the obtained amorphous substance, a peak of the $Li_4P_2S_6$ crystal is confirmed in a range of $32°\leq2\theta\leq33°$ and a half-value width of the peak is 0.64°. On the contrary, the sulfide solid electrolyte glass of the second embodiment allows the sulfide solid electrolyte glass which is high in Li ion conductivity by reason of being so high in amorphous nature as not to have such a peak.

Further, the sulfide solid electrolyte glass of the second embodiment is characterized by "comprising $Li_4P_2S_6$". The phrase "comprising $Li_4P_2S_6$" is the same as the contents described in the above-mentioned First embodiment; therefore, the description herein is omitted. In addition, factors such as the shape and uses of the sulfide solid electrolyte glass of the second embodiment are the same as the contents described in the above-mentioned First embodiment; therefore, the description herein is omitted.

B. Lithium Solid State Battery

Next, a lithium solid state battery of the present invention is described. The lithium solid state battery of the present invention comprises a cathode active material layer containing a cathode active material, an anode active material layer containing an anode active material, and a solid electrolyte layer formed between the above-mentioned cathode active material layer and the above-mentioned anode active material layer, characterized in that at least one of the above-mentioned cathode active material layer, the above-mentioned anode active material layer and the above-mentioned solid electrolyte layer contains the above-mentioned sulfide solid electrolyte glass.

According to the present invention, the use of the above-mentioned sulfide solid electrolyte glass allows the high-output lithium solid state battery.

FIG. 1 is a schematic cross-sectional view showing an example of the lithium solid state battery of the present invention. A lithium solid state battery 10 shown in FIG. 1 comprises: a cathode active material layer 1 containing a cathode active material, an anode active material layer 2 containing an anode active material, a solid electrolyte layer 3 formed between the cathode active material layer 1 and the anode active material layer 2, a cathode current collector 4 for performing current collecting of the cathode active material layer 1, an anode current collector 5 for performing current collecting of the anode active material layer 2, and a battery case 6 for storing these members. In the present invention, at least one of the cathode active material layer 1, the anode active material layer 2 and the solid electrolyte layer 3 is greatly characterized by containing the sulfide solid electrolyte glass described in the above-mentioned "A. Sulfide solid electrolyte glass".

The lithium solid state battery of the present invention is hereinafter described in each constitution.

1. Solid Electrolyte Layer

First, a solid electrolyte layer in the present invention is described. The solid electrolyte layer in the present invention is a layer formed between the cathode active material layer and the anode active material layer, and is a layer containing a solid electrolyte material. The solid electrolyte material contained in the solid electrolyte layer is not particularly limited if the solid electrolyte material has Li ion conductivity.

In the present invention, the solid electrolyte material contained in the solid electrolyte layer is preferably the sulfide solid electrolyte glass described in the above-mentioned "A. Sulfide solid electrolyte glass". The reason therefor is to allow the high-output lithium solid state battery. The content of the solid electrolyte material in the solid electrolyte layer is not particularly limited if the content is a ratio such as to allow desired insulating properties, but is preferably, for example, within a range of 10% by volume to 100% by volume, and above all, within a range of 50% by volume to 100% by volume. In particular, in the present invention, the solid electrolyte layer is preferably composed of only the above-mentioned sulfide solid electrolyte glass. The reason therefor is to allow the higher-output lithium solid state battery.

Further, the solid electrolyte layer may contain a binder. The reason therefor is to allow the solid electrolyte layer having flexibility by containing a binder. Examples of the binder include a fluorine-containing binder such as PTFE and PVDF.

The thickness of the solid electrolyte layer is preferably within a range of 0.1 μm to 1000 μm, for example, and within a range of 0.1 μm to 300 μm, above all. Further, examples of a method of forming the solid electrolyte layer include a method of compression-molding a material for composing the solid electrolyte layer.

2. Cathode Active Material Layer

Next, a cathode active material layer in the present invention is described. The cathode active material layer in the present invention is a layer containing at least a cathode active material, and may further contain at least one of a solid electrolyte material, a conductive material and a binder, as required.

In the present invention, the solid electrolyte material contained in the cathode active material layer is preferably the sulfide solid electrolyte glass described in the above-mentioned "A. Sulfide solid electrolyte glass". The reason therefor is to allow the high-output lithium solid state battery. The content of the solid electrolyte material in the cathode active material layer is preferably, for example, within a range of 0.1% by volume to 80% by volume, above all, within a range of 1% by volume to 60% by volume, and particularly, within a range of 10% by volume to 50% by volume.

The cathode active material is not particularly limited but examples thereof include $LiCoO_2$, $LiMnO_2$, $Li\ NiMn_3O_8$, $LiVO_2$, $LiCrO_2$, $LiFePO_4$, $LiCoPO_4$, $LiNiO_2$ and $LiNi_{1/3}CO_{1/3}Mn_{1/3}O_2$. Examples of the conductive material include acetylene black, Ketjen Black and carbon fiber. Examples of the binder include a fluorine-containing binder such as PTFE and PVDF. Further, the content of the cathode active material in the cathode active material layer is, for example, preferably within a range of 10% by volume to 99% by volume, and more preferably within a range of 20% by volume to 99% by volume.

The thickness of the cathode active material layer is preferably within a range of 0.1 μm to 1000 μm, for example. Further, examples of a method of forming the cathode active material layer include a method of compression-molding a material for composing the cathode active material layer.

3. Anode Active Material Layer

Next, an anode active material layer in the present invention is described. The anode active material layer in the present invention is a layer containing at least an anode active material, and may further contain at least one of a solid electrolyte material, a conductive material and a binder, as required.

In the present invention, the solid electrolyte material contained in the anode active material layer is preferably the sulfide solid electrolyte glass described in the above-mentioned "A. Sulfide solid electrolyte glass". The reason therefor is to allow the high-output lithium solid state battery. The content of the solid electrolyte material in the anode active material layer is preferably, for example, within a range of 0.1% by volume to 80% by volume, above all, within a range of 1% by volume to 60% by volume, and particularly, within a range of 10% by volume to 50% by volume.

Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. A conductive material and a binder used for the anode active material layer are the same as the case of the above-mentioned cathode active material layer. Further, the content of the anode active material in the anode active material layer is, for example, preferably within a range of 10% by volume to 99% by volume, and more preferably within a range of 20% by volume to 99% by volume.

The thickness of the anode active material layer is preferably within a range of 0.1 μm to 1000 μm, for example. Further, examples of a method of forming the anode active material layer include a method of compression-molding a material for composing the anode active material layer.

4. Other Constitutions

A lithium solid state battery of the present invention comprises at least the above-mentioned cathode active material layer, anode active material layer and solid electrolyte layer, and ordinarily further comprising a cathode current collector for collecting the cathode active material layer and an anode current collector for collecting the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. Further, factors such as the thickness and shape of the cathode current collector and the anode current collector are preferably selected properly in accordance with uses of a lithium solid state battery. Further, a battery case of a general lithium solid state battery may be used for a battery case used for the present invention. Examples of the battery case include a battery case made of SUS. Further, with regard to the lithium solid state battery of the present invention, a power generating element may be formed inside an insulating ring.

5. Lithium Solid State Battery

A lithium solid state battery of the present invention may be a primary battery or a secondary battery, and preferably be a secondary battery among them. The reason therefor is to be repeatedly charged and discharged and be useful as a car-mounted battery, for example. Examples of the shape of the lithium solid state battery of the present invention include a coin shape, a laminate shape, a cylindrical shape and a rectangular shape.

Further, a producing method of the lithium solid state battery of the present invention is not particularly limited if the method is a method such as to allow the above-mentioned lithium solid state battery, but the same method as a producing method of a general lithium solid state battery may be used. Examples of the producing method of the lithium solid state battery include a method such that a material composing a cathode active material layer, a material composing a solid electrolyte layer and a material composing an anode active material layer are sequentially pressed to thereby produce a power generating element and this power generating element is stored inside a battery case, which is crimped. Further, the present invention may provide each of a cathode active material layer, an anode active material layer and a solid electrolyte layer, characterized by containing the sulfide solid electrolyte glass described in the above-mentioned "A. Sulfide solid electrolyte glass".

C. Producing Method of Sulfide Solid Electrolyte Glass

Next, a producing method of a sulfide solid electrolyte glass of the present invention is described. The producing method of a sulfide solid electrolyte glass of the present invention is a producing method of a sulfide solid electrolyte glass comprising $Li_4P_2S_6$, comprising: a synthesis step of synthesizing the above-mentioned sulfide solid electrolyte glass by performing vitrification treatment for a raw material composition containing $Li_2S$, a material having a P—P bond and a material having S.

According to the present invention, the use of the raw material composition containing a material having a P—P bond allows the sulfide solid electrolyte glass with high amorphous nature. As a result, the sulfide solid electrolyte glass with high Li ion conductivity may be obtained. Further, the $P_2S_6^{4-}$ structure of $Li_4P_2S_6$ is a structure having a P—P bond, namely, $S_3P—PS_3$. Thus, the advance use of a material having a P—P bond as a starting material allows the $P_2S_6^{4-}$ structure to be formed so easily that the sulfide solid electrolyte glass with high amorphous nature may be obtained.

Figure 2:
FIG. 2 is a flow chart showing an example of a producing method of a sulfide solid electrolyte glass of the present invention.

FIG. 2 is a flow chart showing an example of the producing method of a sulfide solid electrolyte glass of the present invention. First, a raw material composition containing $Li_2S$, P (elemental phosphorus) and S (elemental sulfur) at a molar ratio of $Li_2S:P:S=25:25:50$ is prepared. Next, the raw material composition is subject to mechanical milling to obtain the sulfide solid electrolyte glass.

The synthesis step in the present invention is a step of synthesizing the above-mentioned sulfide solid electrolyte glass by performing vitrification treatment for a raw material composition containing $Li_2S$, a material having a P—P bond and a material having S.

1. Raw Material Composition

The raw material composition in the present invention contains $Li_2S$, a material having a P—P bond and a material having S. Further, the raw material composition may contain only $Li_2S$, a material having a P—P bond and a material having S, or additionally other materials. $Li_2S$ contained in the raw material composition preferably has fewer impurities. The reason therefor is to allow a side reaction to be restrained. Examples of a synthesis method of $Li_2S$ include a method described in JP H07-330312 A. In addition, $Li_2S$ is preferably purified by using a method described in WO 2005/040039.

The material having a P—P bond is not particularly limited if the material allows a desired sulfide solid electrolyte glass. Examples of the material having a P—P bond include elemental phosphorus (P). Examples of the elemental phosphorus include white phosphorus, black phosphorus (β metallic phosphorus), violet phosphorus (α metallic phosphorus), red phosphorus and yellow phosphorus; and preferably, red phosphorus among them. Further, other examples of the material having a P—P bond include $P_4S_3$, PS, $P_4S_5$, $P_4S_6$, $P_4S_7$ and $P_4S_8$.

Further, the material having S is not particularly limited if the material allows a desired sulfide solid electrolyte glass. Examples of the material having S include elemental sulfur (S). Examples of the elemental sulfur include $S_8$ (rhombic and monoclinic systems are intermixed), α sulfur (rhombic sulfur), β sulfur (monoclinic sulfur), γ sulfur (monoclinic sulfur) and rubbery sulfur ($S_n$); and preferably, $S_8$.

Further, in the present invention, the ratio of each material in the raw material composition is adjusted so as to allow the sulfide solid electrolyte glass comprising $Li_4P_2S_6$. The phrase "Sulfide solid electrolyte glass comprising $Li_4P_2S_6$" is the same as the contents described in the above-mentioned "A. Sulfide solid electrolyte glass". For example, in the case where the raw material composition contains $Li_2S$, P (elemental phosphorus) and S (elemental sulfur), P is preferably within a range of 16.7 parts by mol to 50 parts by mol, more preferably within a range of 20 parts by mol to 30 parts by mol, and far more preferably within a range of 22 parts by mol to 28 parts by mol with respect to 25 parts by mol of $Li_2S$. Similarly, S is preferably within a range of 33.3 parts by mol to 100 parts by mol, more preferably within a range of 40 parts by mol to 70 parts by mol, and far more preferably within a range of 45 parts by mol to 55 parts by mol with respect to 25 parts by mol of $Li_2S$.

2. Vitrification Treatment

Next, vitrification treatment in the present invention is described. In the present invention, the sulfide solid electrolyte glass is synthesized by performing vitrification treatment for the above-mentioned raw material composition. The vitrification treatment in the present invention is not particularly limited if the treatment is a treatment such as to allow a desired sulfide solid electrolyte glass, but examples thereof include mechanical milling and melt extraction, and mechanical milling is preferable among them. The reason therefor is that treatment at normal temperature may be performed to intend the simplification of production processes.

Mechanical milling is not particularly limited if the mechanical milling is a method of mixing a raw material composition while allowing mechanical energy thereto; examples thereof include ball mill, vibrating mill, turbo mill, mechano-fusion and disk mill, and ball mill is preferable among them and planetary ball mill is particularly preferable. The reason therefor is to efficiently allow a desired sulfide solid electrolyte glass.

Further, various kinds of the conditions of mechanical milling are determined so as to allow a desired sulfide solid electrolyte glass. For example, in the case of using planetary ball mill, a raw material composition and a grinding ball are added and treated at predetermined number of revolutions and time. Generally, larger number of revolutions brings higher production rate of a sulfide solid electrolyte glass, and longer treating time brings higher conversion ratio of a raw material composition into a sulfide solid electrolyte glass. The number of rotating table revolutions in performing planetary ball mill is, for example, preferably within a range of 100 rpm to 800 rpm, and above all within a range of 200 rpm to 600 rpm. Further, the treating time in performing planetary ball mill is, for example, preferably within a range of 1 hour to 100 hours, and above all within a range of 1 hour to 50 hours.

Further, mechanical milling in the present invention may be dry-type mechanical milling or wet-type mechanical milling, and the latter is preferable. The reason therefor is to allow the raw material composition to be prevented from anchoring on a wall surface of a vessel and allow the sulfide solid electrolyte glass with higher amorphous nature. Liquid used for wet-type mechanical milling is not particularly limited if the liquid has properties for not generating hydrogen sulfide in a reaction with the above-mentioned raw material composition. Generally, hydrogen sulfide is generated in such a manner that a proton dissociated from a molecule of the liquid reacts with the raw material composition and the sulfide solid electrolyte glass. Thus, the above-mentioned liquid preferably has such aprotic properties as not to generate hydrogen sulfide. Ordinarily, aprotic liquid may be roughly divided into polar aprotic liquid and nonpolar aprotic liquid.

The polar aprotic liquid is not particularly limited; examples thereof include ketones such as acetone; nitriles such as acetonitrile; amides such as N,N-dimethylformamide (DMF); and sulfoxides such as dimethyl sulfoxide (DMSO).

Examples of the nonpolar aprotic liquid include alkane which is liquid at normal temperature (25° C.). The above-mentioned alkane may be chain alkane or cyclic alkane. The carbon number of the above-mentioned chain alkane is preferably 5 or more, for example. On the other hand, the upper limit of the carbon number of the above-mentioned chain alkane is not particularly limited if the chain alkane is liquid at normal temperature. Specific examples of the above-mentioned chain alkane include pentane, hexane, heptane, octane, nonane, decane, undecane, dodecane and paraffin. The above-mentioned chain alkane may have a branch. On the other hand, specific examples of the above-mentioned cyclic alkane include cyclopentane, cyclohexane, cycloheptane, cyclooctane and cycloparaffin.

Other examples of the nonpolar aprotic liquid include aromatic hydrocarbons such as benzene, toluene and xylene; chain ethers such as diethyl ether and dimethyl ether; cyclic ethers such as tetrahydrofuran; alkyl halides such as chloroform, methyl chloride and methylene chloride; esters such as ethyl acetate; and fluorine-based compounds such as benzene fluoride, heptane fluoride, 2,3-dihydroperfluoropentane and 1,1,2,2,3,3,4-heptafluorocyclopentane.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Lithium sulfide ($Li_2S$), elemental phosphorus having a P—P bond (P, red phosphorus) and elemental sulfur (S, $S_8$) were used as a starting material. These powders of $Li_2S$, P and S were weighed by 0.6516 g, 0.4391 g and 0.9093 g respectively in a glove box under an Ar atmosphere (a dew point of −70° C.) so as to become a molar ratio of 25$Li_2$S.25P.50S. Next, dehydrated heptane (a moisture amount of 30 ppm or less) was weighed by 4 g. These materials were projected into a vessel of planetary ball mill (45 cc, made of $ZrO_2$), and $ZrO_2$ ball (ϕ5 mm, 53 g) was projected thereinto to hermetically seal the vessel completely (an Ar atmosphere). This vessel was mounted on a planetary ball milling machine (P7™ manufactured by Fritsch Japan Co., Ltd.) to perform mechanical milling for 40 hours at the number of rotating table revolutions of 500 rpm. Thereafter, the obtained sample was dried in a vacuum at a temperature of 150° C. to obtain a sulfide solid electrolyte material (glass with $Li_4P_2S_6$ composition).

Comparative Example 1

Lithium sulfide ($Li_2S$), phosphorus pentasulfide ($P_2S_5$) and phosphorus trisulfide ($P_2S_3$) were used as a starting material. These powders of $Li_2S$, $P_2S_5$ and $P_2S_3$ were weighed by 0.6516 g, 0.7880 g and 0.5606 g respectively in a glove box under an Ar atmosphere (a dew point of −70° C.) so as to become a molar ratio of 67$Li_2$S.17$P_2S_5$.17$P_2S_3$. Next, dehydrated heptane (a moisture amount of 30 ppm or less) was weighed by 4 g. A sulfide solid electrolyte material (amorphous substance with $Li_4P_2S_6$ composition) was obtained in the same manner as Example 1 except for using these materials.

Comparative Example 2

The sulfide solid electrolyte material obtained in Example 1 was heat-treated on the conditions of 450° C. and 10 hours under an Ar atmosphere to obtain a sulfide solid electrolyte material (crystal with $Li_4P_2S_6$ composition).

[Evaluation]
(X-Ray Diffraction Measurement)

Figure 3:
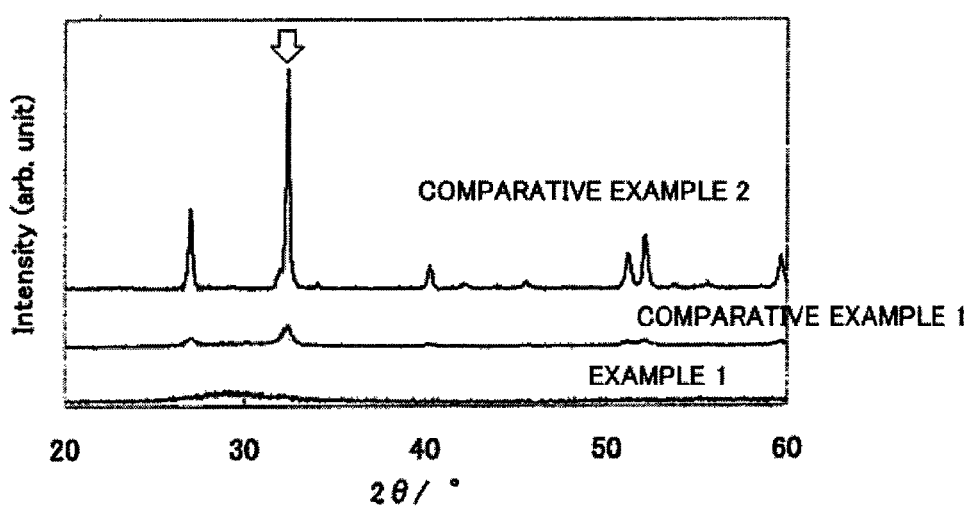
FIG. 3 is a result of X-ray diffraction measurement of a sulfide solid electrolyte material each obtained in Example 1 and Comparative Examples 1 and 2.

X-ray diffraction (XRD) measurement using a CuKα ray was performed for the sulfide solid electrolyte material obtained in Example 1 and Comparative Examples 1 and 2. RINT UltimaIII™ manufactured by Rigaku Corporation was used for XRD measurement. The results are shown in FIG. 3. As shown in FIG. 3, in Comparative Example 2 as the crystal with $Li_4P_2S_6$ composition, a main peak was observed in a range of 32°≤2θ≤33°. A half-value width of this peak was 0.20°. Further, in Comparative Example 1, a peak was observed in a range of 32°≤2θ≤33° and it was confirmed that crystallinity was somewhat exhibited. A half-value width of this peak was 0.64°. On the contrary, in Example 1, no peaks were observed in a range of 32°≤2θ≤33° and other ranges. The reason therefor is conceived to be that the $P_2S_6^{4-}$ structure having a P—P bond was easily formed as compared with Comparative Example 1 by reason of using elemental phosphorus having a P—P bond in Example 1.

(Raman Spectroscopy Measurement)

Figure 4:
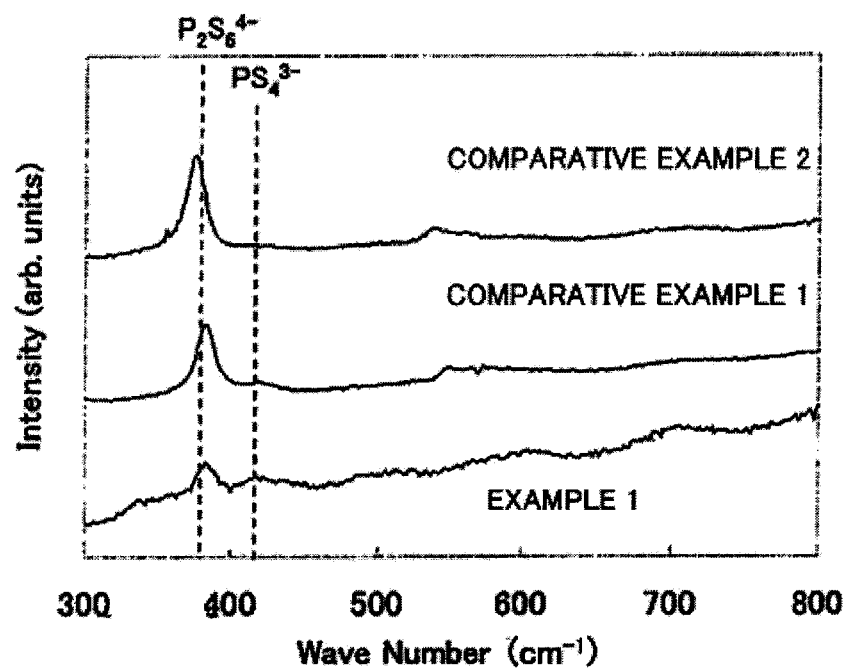
FIG. 4 is a result of Raman spectroscopy measurement of a sulfide solid electrolyte material each obtained in Example 1 and Comparative Examples 1 and 2.

Raman spectroscopy measurement was performed for the sulfide solid electrolyte material each obtained in Example 1 and Comparative Examples 1 and 2. Nanofinder SOLAR T II™ manufactured by Tokyo Instruments, Inc. was used for Raman spectroscopy measurement. The results are shown in FIG. 4. As shown in FIG. 4, any of the sulfide solid electrolyte materials obtained in Example 1 and Comparative Examples 1 and 2 had the peak of the $P_2S_6^{4-}$ structure in a range of 370 $cm^{-1}$ to 390 $cm^{-1}$. Further, no peaks of other structures such as a $PS_4^{3-}$ structure were observed. It was confirmed by these facts that any of the sulfide solid electrolyte materials obtained in Example 1 and Comparative Examples 1 and 2 was the sulfide solid electrolyte material comprising approximately only $Li_4P_2S_6$.

(Differential Thermal Analysis)

Figure 5A:
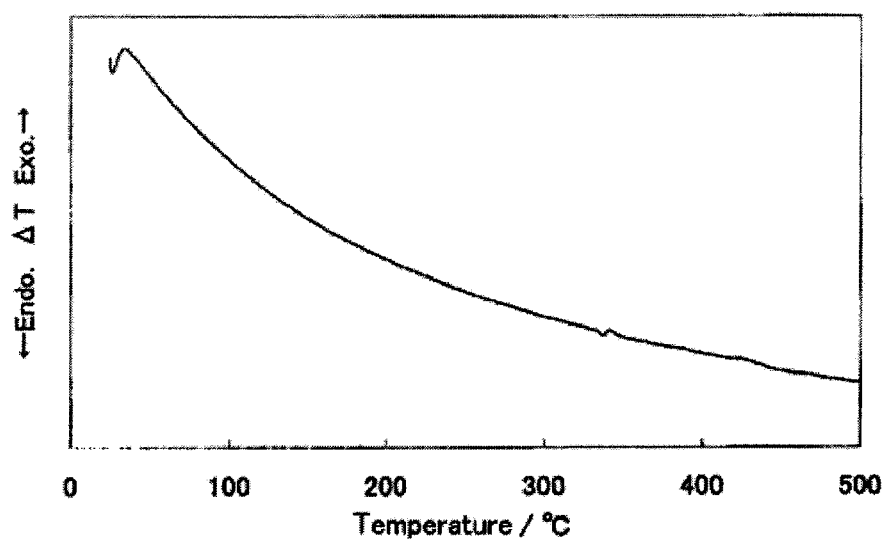
FIGS. 5A and 5B are each a result of differential thermal analysis of a sulfide solid electrolyte material obtained in Example 1.
Figure 5B:
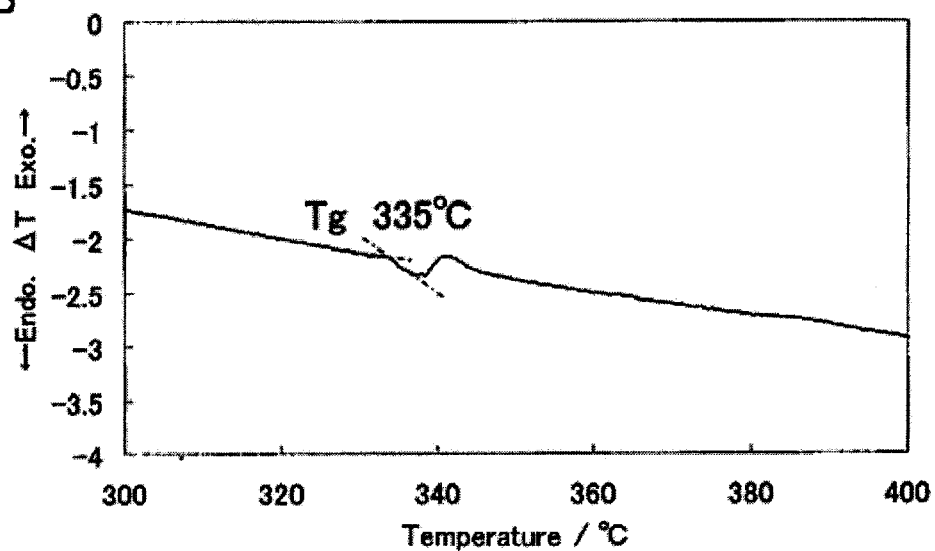
Figure 6A:
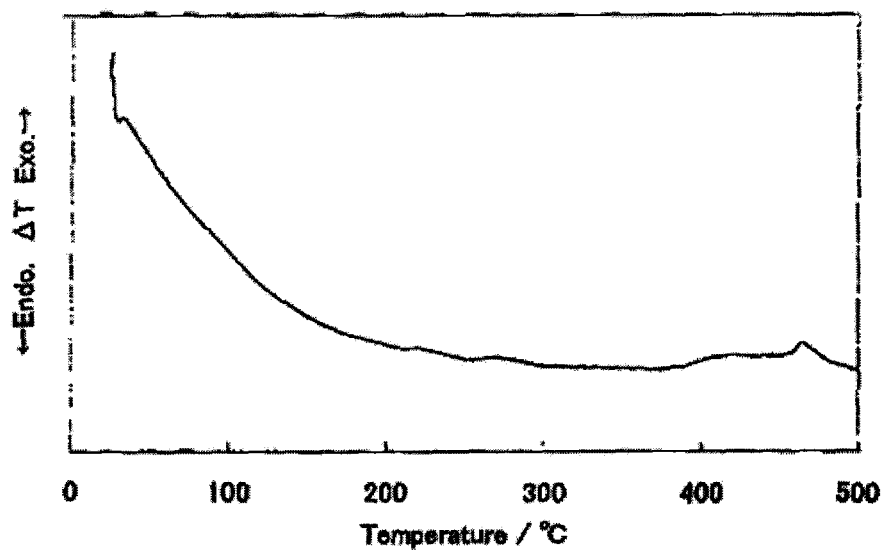
FIGS. 6A and 6B are each a result of differential thermal analysis of a sulfide solid electrolyte material obtained in Comparative Example 1.
Figure 6B:
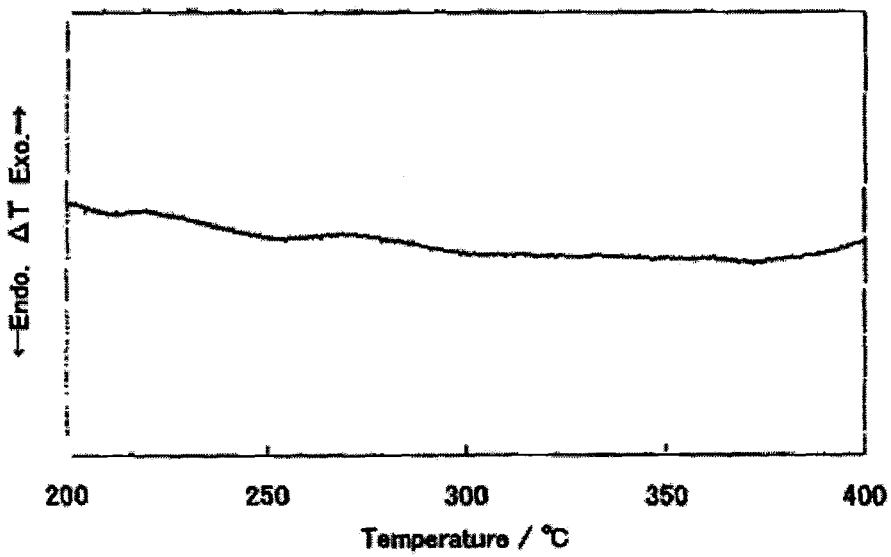

Differential thermal analysis (DTA) was performed for the sulfide solid electrolyte material obtained in Example 1. TGA/SDTA851e™ manufactured by Mettler-Toledo International Inc. was used for DTA. The results are shown in FIGS. 5A and 5B. FIG. 5B is a magnified view in which part of temperature range in FIG. 5A is magnified. As shown in FIGS. 5A and 5B, in Example 1, glass transition was confirmed at a temperature of 335° C. and crystallization peak was confirmed at a temperature of 340° C. It was confirmed that the sulfide solid electrolyte material obtained in Example 1 was glass in the strict sense by reason of being an amorphous substance as shown in FIG. 3 and having a glass transition point as shown in FIGS. 5A and 5B. Further, when differential thermal analysis was performed similarly for the sulfide solid electrolyte material obtained in Comparative Example 1, as shown in FIGS. 6A and 6B, a glass transition point was not confirmed. It was confirmed by this fact that the sulfide solid electrolyte material obtained in Comparative Example 1 was not glass in the strict sense even though an amorphous substance.

(Li Ion Conductivity Measurement)

Figure 7:
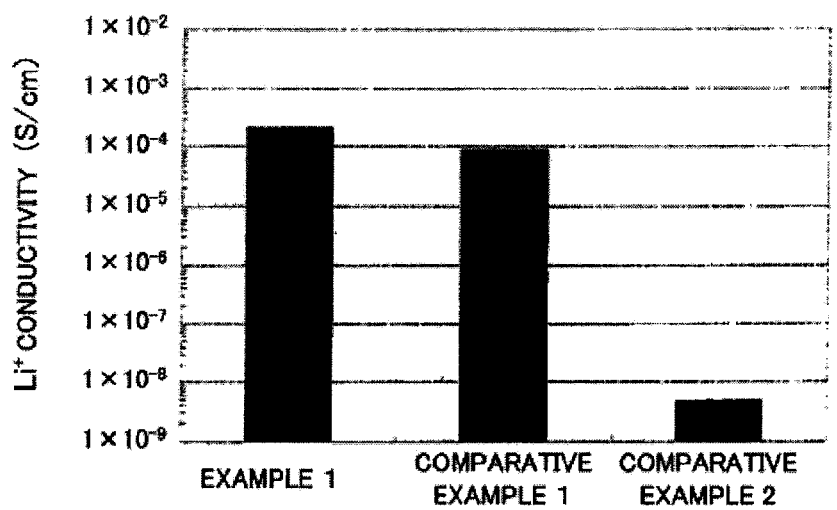
FIG. 7 is a result of Li ion conductivity measurement of a sulfide solid electrolyte material each obtained in Example 1 and Comparative Examples 1 and 2.

Li ion conductivity (normal temperature) measurement by an alternating current impedance method was performed for the sulfide solid electrolyte material each obtained in Example 1 and Comparative Examples 1 and 2. Li ion conductivity measurement was as follows. Added to a support tube (made of Macor) was 100 mg of a sample and was held between electrodes made of SKD. Thereafter, the sample was pressed into powder at a pressure of 4.3 ton/$cm^2$ to perform impedance measurement while constraining the sample at 6 Ncm. Solartron 1260™ was used for the measurement and the measurement conditions were an impressed voltage of 5 mV and a measuring frequency band of 0.01 MHz to 1 MHz. The results are shown in FIG. 7. As shown in FIG. 7, Example 1 was higher in Li ion conductivity than Comparative Example 1. Li ion conductivity was $2.1 \times 10^4$ S/cm in Example 1, $9.0 \times 10^{-5}$ S/cm in Comparative Example 1 and $4.8 \times 10^{-9}$ S/cm in Comparative Example 2.

Further, the reason why Example 1 was higher in Li ion conductivity than Comparative Example 1 is conceived to be as follows. That is to say, as shown in FIG. 3, in the sulfide solid electrolyte material of Comparative Example 1, a peak was observed in a range of 32°≤2θ≤33° and a small amount of the $Li_4P_2S_6$ crystal was contained. This $Li_4P_2S_6$ crystal was greatly low in Li ion conductivity as shown in Comparative Example 2 of FIG. 7. On the contrary, it is conceived that the sulfide solid electrolyte material of Example 1 became higher in Li ion conductivity than that of Comparative Example 1 by reason of not containing the $Li_4P_2S_6$ crystal which is low in Li ion conductivity.

(Water Resistance Evaluation)

Figure 8:
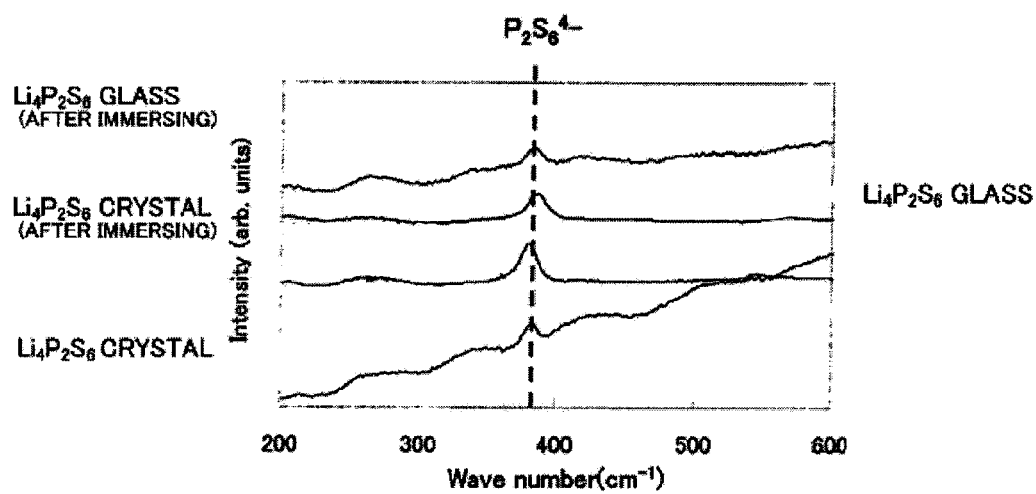
FIG. 8 is a result of water resistance evaluation of a sulfide solid electrolyte material obtained in Example 1 and Comparative Example 2.

Water resistance evaluation was performed for the sulfide solid electrolyte material each obtained in Example 1 and Comparative Example 2. Water resistance evaluation was performed by immersing a sample in pure water to observe change of Raman spectrum before and after immersing. The results are shown in FIG. 8. As shown in FIG. 8, with regard to the sulfide solid electrolyte material each obtained in Example 1 and Comparative Example 2, the position of a peak did not change before and after immersing. It was suggested by this fact that the $P_2S_6^{4-}$ structure was an extremely stable structure which does not change even in contacting with water. Example 1 and Comparative Example 2 do not differ so much from the viewpoint of water resistance, but as shown in FIG. 7, Example 1 has the advantage that Li ion conductivity is as high as approximately $10^5$ times as compared with Comparative Example 2. The following is not shown in the drawings; with regard to the sulfide solid electrolyte material ($75Li_2S\cdot 25P_2S_5$) as an amorphous substance with $Li_3PS_4$ composition, the peak position of Raman spectrum changed greatly before and after immersing, and it was suggested that the $PS_4^{3-}$ structure was low in stability toward water. It is conceived that the $PS_4^{3-}$ structure changed into a $PO_4^{3-}$ structure due to a reaction with water.

REFERENCE SIGNS LIST

1 . . . Cathode active material layer
2 . . . Anode active material layer
3 . . . Solid electrolyte layer
4 . . . Cathode current collector
5 . . . Anode current collector
6 . . . Battery case
10 . . . Lithium solid state battery

The invention claimed is:

1. A sulfide solid electrolyte glass comprising $Li_4P_2S_6$, wherein the sulfide solid electrolyte glass has a glass transition point of 180° C. to 400° C., and a ratio of a $P_2S_6^{4-}$ structure in all anion structures of the sulfide solid electrolyte glass is 50% by mol or more.

2. The sulfide solid electrolyte glass according to claim 1, wherein the sulfide solid electrolyte glass does not have a peak with a half-value width of 0.64° or less in a range of 32° 2θ 33° in measurement by an X-ray diffraction method using a CuKα ray.

3. A sulfide solid electrolyte glass comprising $Li_4P_2S_6$ and having a glass transition point of 180° C. to 400° C., wherein the sulfide solid electrolyte glass does not have a peak with a half-value width of 0.64° or less in a range of $32°\leq 2\alpha \leq 33°$ in measurement by an X-ray diffraction method using a CuKα ray, and a ratio of a $P_2S_6^{4-}$ structure in all anion structures of the sulfide solid electrolyte glass is 50% by mol or more.

4. A lithium solid state battery comprising a cathode active material layer containing a cathode active material, an anode active material layer containing an anode active material, and a solid electrolyte layer formed between the cathode active material layer and the anode active material layer;

wherein at least one of the cathode active material layer, the anode active material layer and the solid electrolyte layer contains the sulfide solid electrolyte glass according to claim 1.

5. A producing method of a sulfide solid electrolyte glass comprising $Li_4P_2S_6$, comprising:

a synthesis step of synthesizing the sulfide solid electrolyte glass by performing vitrification treatment for a raw material composition containing $Li_2S$, a material having a P—P bond and a material having S, wherein a ratio of a $P_2S_6^{4-}$ structure in all anion structures of the sulfide solid electrolyte glass is 50% by mol or more and wherein the sulfide solid electrolyte glass having a glass transition point of 180° C. to 400° C.

6. The producing method of a sulfide solid electrolyte glass according to claim 5, wherein the material having a P—P bond is elemental phosphorus.

7. The producing method of a sulfide solid electrolyte glass according to claim 5, wherein the material having S is elemental sulfur.

8. The producing method of a sulfide solid electrolyte glass according to claim 5, wherein the vitrification treatment is mechanical milling.

9. A lithium solid state battery comprising a cathode active material layer containing a cathode active material, an anode active material layer containing an anode active material, and a solid electrolyte layer formed between the cathode active material layer and the anode active material layer;

wherein at least one of the cathode active material layer, the anode active material layer and the solid electrolyte layer contains the sulfide solid electrolyte glass according to claim 3.

* * * * *